(12) United States Patent
Bytheway et al.

(10) Patent No.: US 11,168,973 B2
(45) Date of Patent: Nov. 9, 2021

(54) FLEXIBLE THREE-DIMENSIONAL SENSING INPUT DEVICE

(71) Applicant: Cirque Corporation, Sandy, UT (US)

(72) Inventors: Jared Bytheway, Sandy, UT (US); Paul Vincent, Kaysville, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 17/189,505

(22) Filed: Mar. 2, 2021

(65) Prior Publication Data

US 2021/0223887 A1 Jul. 22, 2021

Related U.S. Application Data

(63) Continuation-in-part of application No. 16/750,995, filed on Jan. 23, 2020, and a continuation-in-part of application No. 16/747,317, filed on Jan. 20, 2020.

(51) Int. Cl.
*G06F 3/044* (2006.01)
*G01B 7/06* (2006.01)
*H01M 10/42* (2006.01)
*H01M 10/48* (2006.01)

(52) U.S. Cl.
CPC .............. *G01B 7/08* (2013.01); *G06F 3/044* (2013.01); *H01M 10/4257* (2013.01); *H01M 10/48* (2013.01); *G06F 2203/04102* (2013.01); *H01M 2010/4278* (2013.01)

(58) Field of Classification Search
CPC ............. G06F 3/044–0448; G06F 2203/04102
See application file for complete search history.

(56) References Cited

U.S. PATENT DOCUMENTS

| | | | | |
|---|---|---|---|---|
| 6,160,540 A | * | 12/2000 | Fishkin | G06F 3/0414 345/184 |
| 6,243,074 B1 | * | 6/2001 | Fishkin | G06F 1/16 345/156 |
| 6,243,075 B1 | * | 6/2001 | Fishkin | G06F 1/16 345/156 |
| 6,268,857 B1 | * | 7/2001 | Fishkin | G06F 1/16 345/156 |
| 6,297,805 B1 | * | 10/2001 | Adler | G06F 1/16 345/158 |
| 6,297,838 B1 | * | 10/2001 | Chang | G06F 1/16 345/156 |

(Continued)

*Primary Examiner* — Michael Pervan

(57) ABSTRACT

A device may include a flexible material defining an exterior of a cavity, an interior electrode located within the cavity, a first peripheral electrode peripherally located with respect to the interior electrode on a first side of the interior electrode, a second peripheral electrode peripherally located with respect to the interior electrode on a second side of the interior electrode where the interior electrode is between the first peripheral electrode and the second peripheral electrode, a controller electrically connected to the interior electrode, the first peripheral electrode, and the second peripheral electrode, and programmed instructions written into memory of the controller where the programmed instructions cause the controller, when executed to measure a first capacitance between the first peripheral electrode and the interior electrode and measure a second capacitance between the second peripheral electrode and the interior electrode.

20 Claims, 10 Drawing Sheets

(56) References Cited

U.S. PATENT DOCUMENTS

| | | | | |
|---|---|---|---|---|
| 6,340,957 | B1* | 1/2002 | Adler | G06F 1/1615 |
| | | | | 345/1.3 |
| 6,630,922 | B2* | 10/2003 | Fishkin | G06F 1/16 |
| | | | | 345/156 |
| 7,082,578 | B1* | 7/2006 | Fishkin | G06F 1/16 |
| | | | | 345/184 |
| 9,110,115 | B2 | 8/2015 | Marashdeh | |
| 9,141,225 | B2 | 9/2015 | Cok | |
| 9,259,156 | B2 | 2/2016 | Warner | |
| 9,543,948 | B2 | 1/2017 | Curtis | |
| 2003/0076343 | A1* | 4/2003 | Fishkin | G06F 1/16 |
| | | | | 715/701 |
| 2007/0205995 | A1 | 9/2007 | Woolley | |
| 2010/0097374 | A1 | 4/2010 | Fan | |
| 2012/0013571 | A1 | 1/2012 | Yeh | |
| 2015/0077139 | A1 | 3/2015 | Liu | |
| 2017/0191819 | A1 | 7/2017 | O'Brien | |
| 2017/0241817 | A1 | 8/2017 | Marashdeh | |
| 2017/0371454 | A1 | 12/2017 | Kitada | |
| 2018/0259404 | A1 | 9/2018 | Okada | |
| 2019/0226932 | A1 | 7/2019 | Schumm | |
| 2019/0305776 | A1 | 10/2019 | Herthan | |

\* cited by examiner

FLEXIBLE THREE-DIMENSIONAL SENSING INPUT DEVICE

CROSS REFERENCE TO RELATED APPLICATIONS

The present Application is a continuation-in-part of U.S. patent application Ser. No. 16/747,317 by Jared Bytheway et al., entitled "Battery Swell Detection," filed on Jan. 20, 2020, assigned to the assignee hereof, and expressly incorporated by reference herein. The present Application is also a continuation-in-part of U.S. patent application Ser. No. 16/750,995 by Jon Bertrand et al., entitled "Object Deformation Detection Using Capacitive Sensing," filed on Jan. 23, 2020, assigned to the assignee hereof, and expressly incorporated by reference herein. U.S. patent application Ser. No. 16/750,995 claims the benefit of U.S. Provisional Patent Application No. 62/796,447 by Jon Bertrand et al., entitled "Object Deformation Detection Using Capacitive Sensing," filed on Jan. 24, 2019, assigned to the assignee hereof, and expressly incorporated by reference herein. Each of these references is herein incorporated by reference for all that they disclose

FIELD OF THE DISCLOSURE

This disclosure relates generally to systems and methods for sensing inputs from a flexible input device. In particular, this disclosure relates to systems and methods for detecting compression forces, sizes, expansion amounts, or other characteristics with a flexible input device.

BACKGROUND

A touchpad is often incorporated into laptops and other devices to provide a mechanism for giving inputs to the device. For example, a touchpad may be positioned adjacent to a keyboard in a laptop and include a surface that can be touched by the user. Touchpads may operate using capacitive sensing, a technology that senses the change of capacitance where a finger touches the pad. Styluses or other types of electrically conductive objects may also be detectable with capacitance sensing.

SUMMARY

In some embodiments, a device may include a flexible material defining an exterior of a cavity, an interior electrode located within the cavity, a first peripheral electrode peripherally located with respect to the interior electrode on a first side of the interior electrode, a second peripheral electrode peripherally located with respect to the interior electrode on a second side of the interior electrode where the interior electrode is between the first peripheral electrode and the second peripheral electrode, a controller electrically connected to the interior electrode, the first peripheral electrode, and the second peripheral electrode, and programmed instructions written into memory of the controller where the programmed instructions cause the controller, when executed to measure a first capacitance between the first peripheral electrode and the interior electrode and measure a second capacitance between the second peripheral electrode and the interior electrode.

The interior electrode may be located approximately in a central position of the cavity.

The interior electrode may be a transmit electrode, and the first peripheral electrode and the second peripheral electrode are sense electrodes.

The flexible material may be an elastomeric material.

The flexible material may define an exterior of a ball when no external forces are applied to the exterior.

The flexible material may define an exterior of a cylinder when no external forces are applied to the exterior.

The programmed instructions may cause the controller, when executed, to interpret the first capacitance to determine a first distance between the interior electrode and the first peripheral electrode, interpret the second capacitance to determine a second distance between the interior electrode and the second peripheral electrode, and use the first distance and the second distance to determine a shape of the exterior when at least one external force is applied to the exterior.

The programmed instructions may cause the controller, when executed, to interpret the first capacitance to determine a first distance between the interior electrode and the first peripheral electrode, interpret the second capacitance to determine a second distance between the interior electrode and the second peripheral electrode, and use the first distance and the second distance to determine a force value of external forces applied to the exterior, The programmed instructions may cause the controller, when executed, to interpret the first capacitance to determine a first distance between the interior electrode and the first peripheral electrode, interpret the second capacitance to determine a second distance between the interior electrode and the second peripheral electrode, and use the first distance and the second distance to determine an expansion amount of the exterior.

The programmed instructions may cause the controller, when executed, to subtract an influence on at least one of the first capacitance and the second capacitance where the influence is generated by electrically conductive medium disposed within the cavity and connected to the interior electrode.

Measurement values of first capacitance and the second capacitance may be used as inputs to control an aspect of a gaming application.

The device may include an electrically conductive medium connected to the interior electrode located within the cavity and a shield covering the electrically conductive medium to prevent a voltage on the electrically conductive medium from affecting an electric field within the cavity.

The device may include a peripheral transmit electrode where at least a portion of the peripheral transmit electrode is positioned adjacent to at least one of the first peripheral electrode and the second peripheral electrode and where the programmed instructions cause the controller, when executed, to determine an exterior capacitance between the peripheral transmit electrode and at least one of the first peripheral electrode and the second peripheral electrode and use the exterior capacitance to determine a proximity value of an external object to the exterior.

At least one of the first peripheral electrode and the second peripheral electrode may be attached to the flexible material.

At least one of the first peripheral electrode and the second peripheral electrode may be proximate to the flexible material.

In examples with multiple transmit electrodes, each of the transmit electrodes may be electrically insulated from each other. In some examples, multiple transmit electrodes are electrically independent of each other. Further, each of the transmit electrodes may be individually activated with respect to each other.

In examples with multiple sense electrodes, each of the sense electrodes may be electrically insulated from each other. In some examples, multiple sense electrodes are electrically independent of each other.

In some embodiments, a computer-program product for using a device may include a non-transitory computer-readable medium storing instructions executable by a processor to measure a first capacitance between a first peripheral electrode and an interior electrode located within an interior of a cavity defined, at least in part, by an elastomeric material and measure a second capacitance between the second peripheral electrode and the interior electrode where the interior electrode is between the first peripheral electrode and the second peripheral electrode.

The instructions may be executable by a processor to use the first capacitance and the second capacitance to determine a current shape of an exterior of the flexible material.

The instructions may be executable by a processor to use the first capacitance and the second capacitance to determine a force value of external forces applied to an exterior of the flexible material.

The instructions may be executable by a processor to use the first capacitance and the second capacitance to determine distance to determine an expansion amount of the flexible material.

The instructions may be executable by a processor to determine an exterior capacitance between a peripheral transmit electrode and at least one of the first peripheral electrode and the second peripheral electrode and use the exterior capacitance to determine a proximity value of an external object to the exterior.

Figure 1:
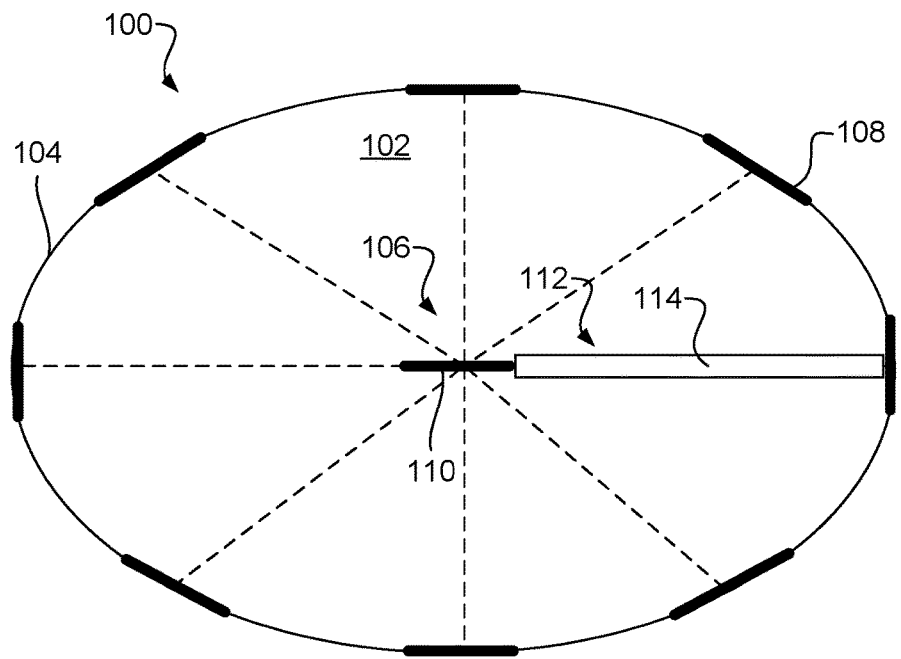
FIG. 1 depicts an example of a three-dimensional input device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention, Various changes may be made in the function and arrangement of elements.

Thus, various embodiments may omit, substitute, or add various procedures or components as appropriate, For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

It should be understood that use of the terms "touch pad" and "touch sensor" throughout this document may be used interchangeably with "capacitive touch sensor," "capacitive sensor," "capacitive touch and proximity sensor," "proximity sensor," "touch and proximity sensor," "touch panel," "trackpad", "touch pad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

For the purposes of this disclosure, the term "proximity value" generally refers to a change in capacitance based on the presence of an electrically conductive object spaced away from the capacitance sensor. In some cases, the closer the object approaches the capacitance sensor, the greater the change in capacitance resulting in a higher proximity value.

For the purposes of this disclosure, the term "flexible material" generally refers to a material that exhibits characteristics to permit stretching, compression, and deformations. In some cases, such flexible materials exhibit low signs of wear or fatigue compared to materials that are considered to be brittle or inflexible. Such flexible materials generally only elastically deform rather than plastically deform under the pressures capable of being generated by a user's hand or internal pressures. In some cases, the flexible material may inflate to a volume increase of up to three times the input device's size or more or be compressed to three times its original size without sustaining a plastic deformation or signs of fatigue. In some cases, the flexible material is an elastomeric material, rubber, latex, polymers, other kinds of flexible materials, or combinations thereof.

For the purposes of this disclosure, the term "peripheral electrode" generally refers to an electrode that is situated closer to the cavity wall than the interior electrode is from the flexible material. In some cases, the peripheral electrode is located less than one half of the distance away from the cavity wall than the distance from the interior electrode is. In yet another example, the peripheral electrode may be located less than one third of the distance away from the cavity wall than the interior electrode. In some examples, the peripheral electrode is located less than a quarter of the distance from the cavity wall compared with the distance between the interior electrode and the cavity wall. In some cases, the peripheral electrode is located adjacent to the cavity wall, is attached to the cavity wall, is embedded into the cavity wall, is located within the thickness of the cavity wall, is attached to the outside of the cavity wall, located proximate the cavity wall, located in another location, or combinations thereof. In some examples, the peripheral electrode may be located outside of the cavity within a layer forming the flexible material or be attached to the outside of the flexible material.

FIG. 1 depicts an example of a three-dimensional input device 100. In this example, the three-dimensional input device 100 includes a cavity 102 defined by a flexible material 104. An interior electrode 106 is positioned within the cavity 102. Multiple peripheral electrodes 108 are positioned peripherally with respect to the interior electrode 106.

The three-dimensional input device may have any appropriate shape. For example, the three-dimensional input device may have a spherically shape, a ball shape, a rounded shape, a generally rectangular shape, a generally triangular shape, a generally cylindrical shape, or combinations thereof. In some cases, the three-dimensional input device 100 is sized so that the three-dimensional input device 100 can be held in a person's hand in at least one dimension. For example, the three-dimensional input device 100 may have a generally spherically shape that is sized so that a user can grasp the perimeter of the three-dimensional input device 100 about any orientation of the input device 100. In another example, the three-dimensional input device 100 has a generally cylindrical shape sized so that a person can grasp the three-dimensional input device 100 about its width, but the length of the three-dimensional input device 100 may or may not be too long to be graspable with a user's hand.

The three-dimensional input device 100 may be a flexible input device, a compressible input device, an expandable input device, or combinations thereof. The flexible material may be a material that is less prone to cracking or plastically deforming under pressure. Such flexible materials may be stretchable and/or three-dimensional and return to their original shape after the forces are removed. In some examples, the flexible material may be an elastomeric material, latex, rubber, a polymer, another type of flexible material, or combinations thereof.

The peripheral electrodes 108 may be positioned away from the interior electrode 106 at a distance. In some cases, each of the peripheral electrodes 108 are positioned at the same distance away from the interior electrode 106. The peripheral electrodes 108 may be equidistantly distributed about the perimeter of the shape of the input device in at least one dimension, or alternatively, the peripheral electrodes 108 may be spaced unevenly about the input device's shape. The peripheral electrodes 108 may be located next to the flexible material, attached to the flexible material, embedded into the flexible material, on the outside of the flexible material, or combinations thereof.

In some cases, the cavity 102 of the three-dimensional input device 100 is filled with a substance such as foam, a deformable gel, a deformable substance, a liquid, air, another type of gas, or combinations thereof. The internal substance may help provide the overall shape of the three-dimensional input device 100. In some cases, the internal substance may be substantially transparent or at least semi-transparent to electrical fields. In some cases, the internal substance may include a dielectric material that aids in the propagation of electrical fields. In some cases, the internal substance may help keep the peripheral electrodes spaced away from each other and the interior electrode 106.

In some cases, the material in the cavity has multiple layers of difference substances to provide different characteristics to the input device. For example, a heavier substance may be used closer to the center of the input device to get the input device to a desirable amount of weight. In other examples, the outside substance layers may have a soft/more compressible characteristic to optimize surface deflection while the deeper regions of the cavity exhibit more rigidity.

In yet another example, the internal substances of the input device may cause different outer regions of the input device to have different characteristics. For example, certain hand hold positions may exhibit more compressible characteristics, than other regions of the input device. In some cases, a first side of the input device's exterior may have a more rigid characteristic than a side opposite side to the first side of the input device's exterior. The changes in rigidity may affect the amount of surface deflection available in the input device's exterior, thereby affecting the amount of surface deflection that may be measured by movement of the peripheral electrodes.

In some cases, the substance, substance composite, substance layers, substance mixtures, or multiple substances within the cavity may have constant dielectric values. While some of the substances in the cavity may have different dielectric values, these dielectric values and their locations may be known, which may be reflected in the algorithms used to interpret data input from the input device.

The interior electrode 106 may be a transmit electrode and the peripheral electrodes 108 may be sense electrodes. In the depicted example, the interior electrode 106 includes an exposed portion 110 and a shielded portion 112. The shielded portion 112 of the interior electrode 106 may be made of an electrically conductive material that is surrounded by a shield 114. The shielded portion 112 of the interior electrode 106 may provide an electrical charge to the exposed portion 110 of the interior electrode 106 without substantially contributing to an electric field within the cavity 102. The shield 114 may also be made of a material that is electrically conductive. However, the shield 114 may also be electrically isolated from the electrically conductive portion of the interior electrode 106 by being spaced apart from the electrically conductive portion of the interior electrode 106 and having a dielectric material positioned between the shield 114 and the electrically conductive portion of the interior electrode 106. The electrical material may be any appropriate type of material, including, but not limited to, air, a gas, a foam, a compressible material, an elastomeric material, a liquid, another type of material having dielectric characteristics, or combinations thereof.

When a voltage is imposed on the interior electrode 106, an electric field may be measurable between the interior electrode 106 and each of the peripheral electrodes 108. The measurable electric field may be based, at least in part, on the distance between the interior electrode 106 and the peripheral electrodes 108. In the example depicted in FIG. 1, there are no external forces pushing any of the peripheral electrodes inward towards the interior electrode 106. Under these circumstances, the measurable electric field may be consistent and may be considered to be a baseline capacitance measurement. In some cases, each of the peripheral electrodes may measure an independent baseline capacitance. However, in some cases, more than one of the peripheral electrodes may measure the same baseline capacitance measurement.

Figure 2:
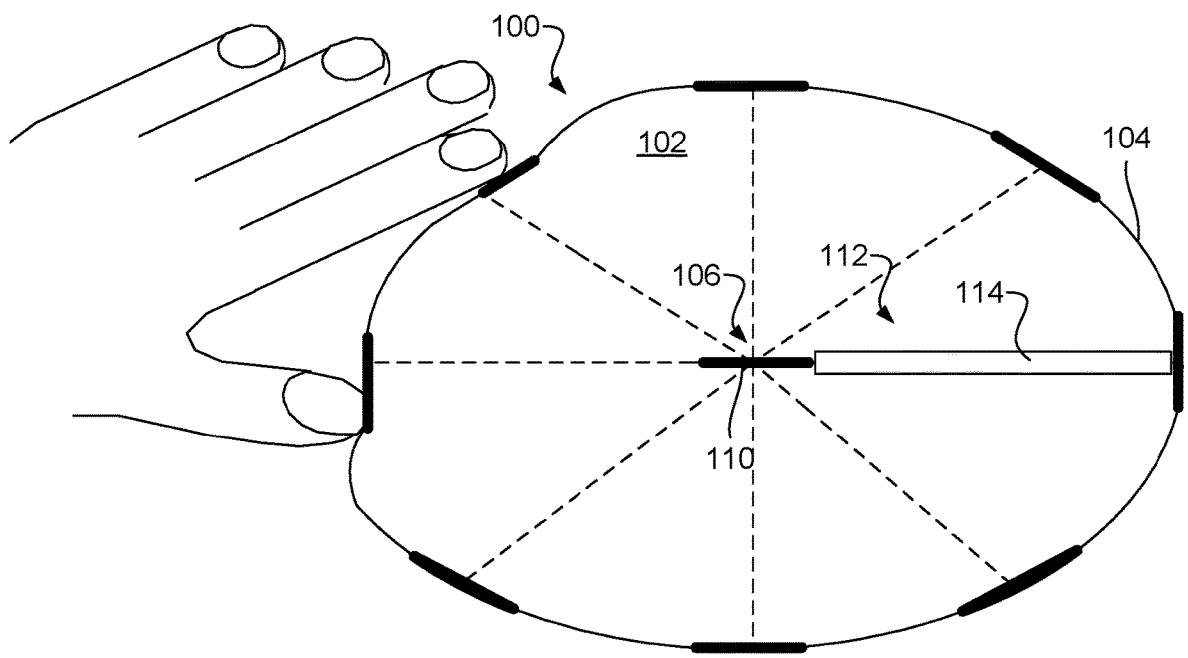
FIG. 2 depicts an example of applying external forces on a three-dimensional input device in accordance with the disclosure.

In situations, like those depicted in FIG. 2, where one of the peripheral electrodes 108 is pushed inward towards the interior electrode 106, the distance between that peripheral electrode and the interior electrode 106 changes. This change in distance causes the measurable capacitance to change from the baseline capacitance measurement to a new capacitance measurement. The new capacitance measurement may be used to determine the new distance between the pushed peripheral electrode 108 and the interior electrode 106. Determining the new distance may be used to determine the shape of the exterior of the three-dimensional input device, the amount of force applied to push in the peripheral electrode, determine another characteristic, or combinations thereof.

While the examples of FIGS. 1 and 2 depict the interior electrode as a transmit electrode and the peripheral electrodes as sense electrodes, in other examples the interior electrode is a sense electrode and the peripheral electrodes are transmit electrodes.

Also, while the examples of FIGS. 1 and 2 depict a shielded portion of the interior electrode, in other examples, the entire interior electrode may be unshielded. In such an example, the influence that the unshielded portion of the interior electrode imposes on the electric field within the cavity may be subtracted from the capacitance measurements.

Figure 3:
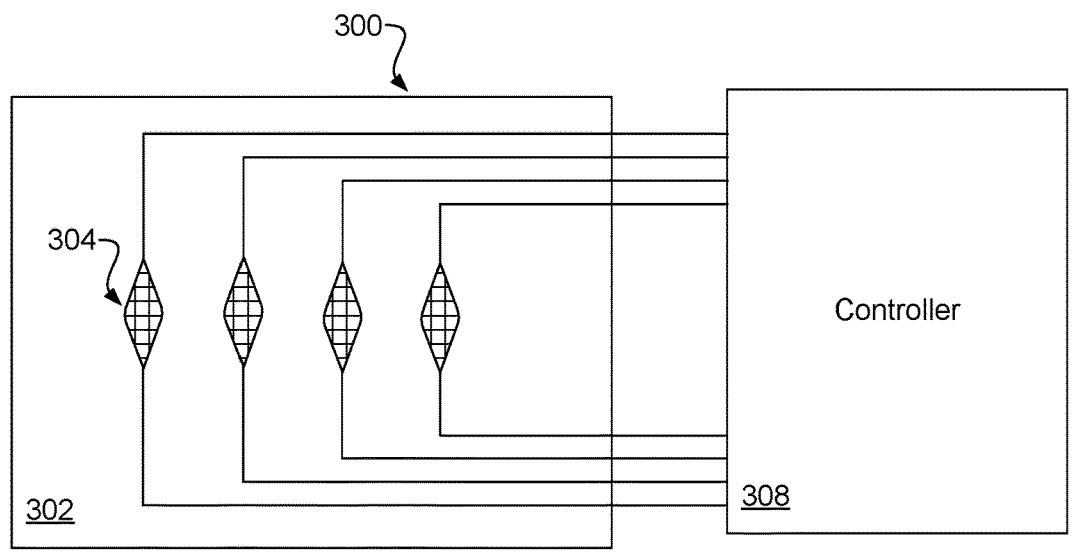
FIG. 3 depicts an example of circuitry of a three-dimensional input device in accordance with the disclosure.

FIG. 3 depicts an example of circuitry for the sense electrodes 304 in the three-dimensional input device 300. In this example, the three-dimensional input device 300 includes the flexible material 302 and a set of sense electrodes 304 are disposed on the flexible material 302. The flexible material is depicted as a sheet of material for illustrative purposes. However, when the flexible material is incorporated into a three-dimensional input device, the edges of the sheet material depicted in FIG. 3 may be connected so that the flexible material defines a cavity. Each of the sense electrodes 304 may be electrically isolated from one another so that the electrodes do not short to each other.

In the example of FIG. 3, each of the sense electrodes are aligned in a horizontal row. In such an example, when the sheet material is connected at the edges to define a cavity, the sense electrodes may be aligned in the three-dimensional input device. In this example, the sense electrodes may form a circular arrangement used to determine the width and shape of the three-dimensional input device of that specific swath of the three-dimensional input device.

Figure 4:
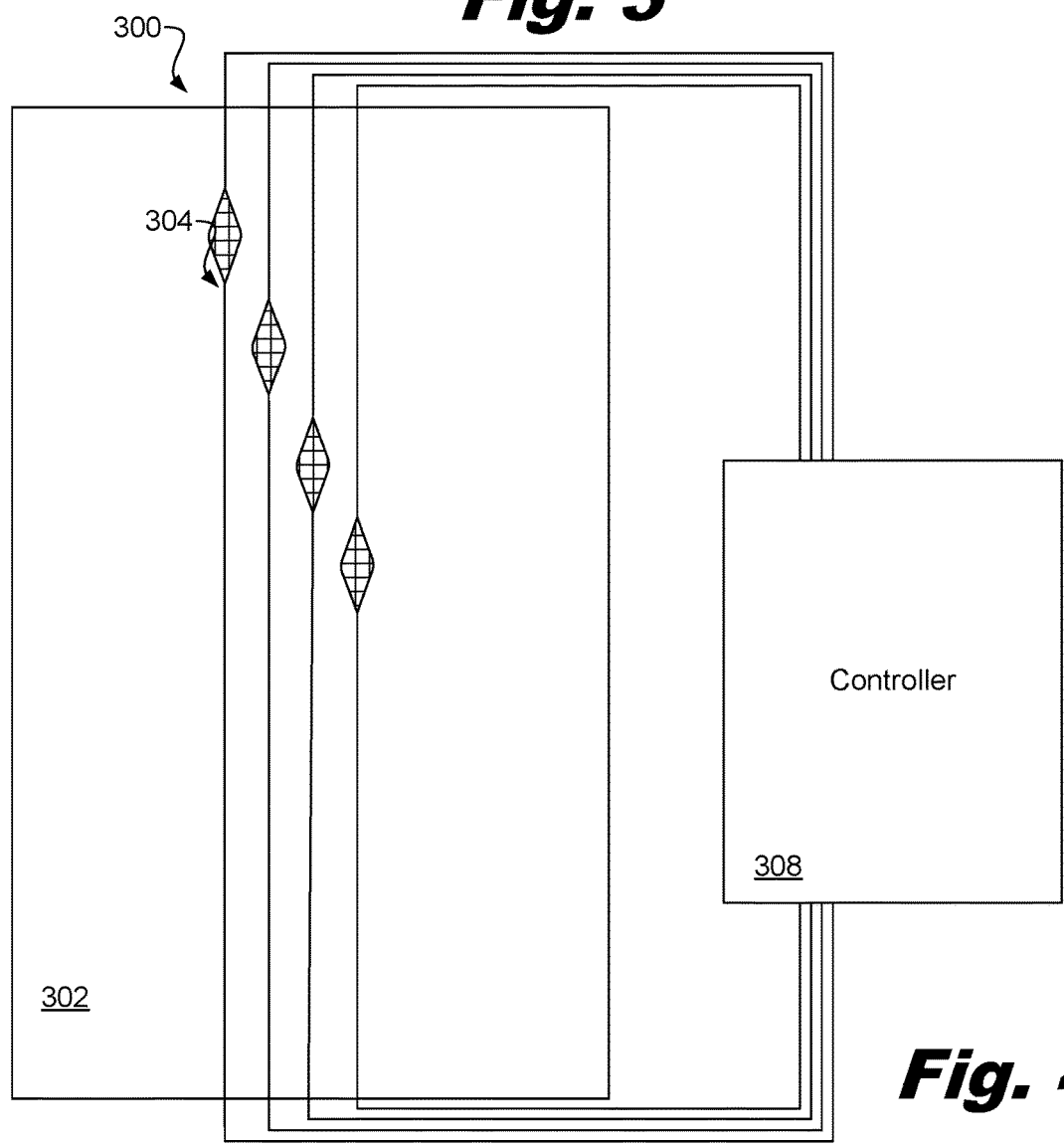
FIG. 4 depicts an example of circuitry of a three-dimensional input device in accordance with the disclosure.

In contrast, FIG. 4 depicts an example where the sense electrodes 304 are arranged in a horizontal and a vertical orientation. In such an example when the sheet material is joined at its edges to define the cavity, the sensor electrodes may sense the width and/or shape of a wider swath of the three-dimensional input device.

As shown in FIGS. 3 and 4, the three-dimensional input device 300 includes a capacitance measurement controller 308. The capacitance measurement controller 308 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases where the peripheral electrodes are transmit electrodes, the transmit electrodes can be driven one at a time in sequence, or randomly, or drive multiple electrodes at the same time in encoded patterns. Electrodes may also be arranged in non-rectangular arrays, such as radial patterns, linear strings, or the like. Other configurations are also possible.

In some cases, the component does not depend upon an absolute capacitive measurement to determine the distance between the interior electrode and at least one peripheral electrode. The input device 300 may measure an imbalance in electrical charge to the electrode functioning as a sense electrode which can, in some examples, be any of the electrodes of the interior electrode or the peripheral electrodes.

In some examples, the three-dimensional input device has the ability to switch between which of the interior electrode and the peripheral electrodes are the transmit electrode and the sense electrodes. While this example has been described with the touch input component 200 having the flexibility of the roles of these electrodes between sense and transmit electrodes, in other examples, each of electrodes is dedicated to either a transmit function or a sense function.

While the examples of FIGS. 3 and 4 depict specific electrode patterns, any appropriate electrode pattern may be used. For example, a non-exhaustive list of electrode patterns may include vertical patterns, horizontal patterns, diagonal patterns, circular patterns, wavy patterns, symmetric patterns, asymmetric patterns, spherical patterns, other types of patterns, or combinations thereof.

Figure 5:
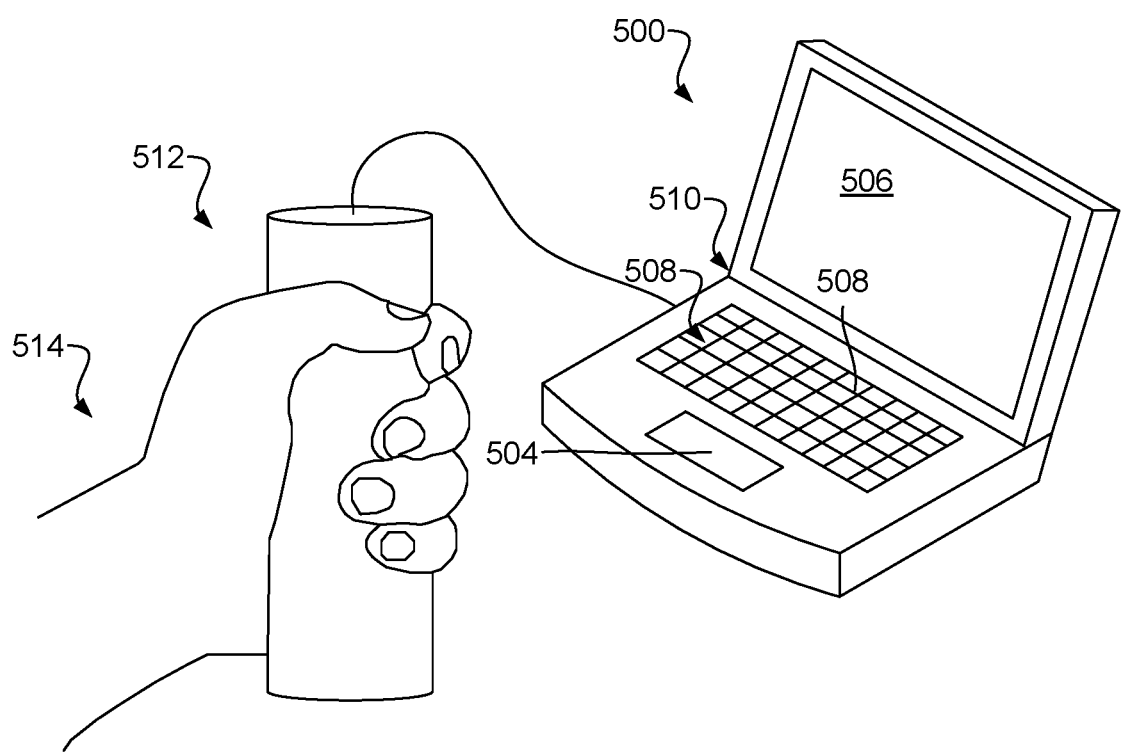
FIG. 5 depicts an example of a three-dimensional input device in wired communication with a computing device in accordance with the disclosure.

FIG. 5 depicts an example of a computing device 500. In this example, the computing device is a laptop. In the illustrated example, the computing device 500 includes input components, such as a keyboard 502 and a touch pad 504. The computing device 500 also includes a display 506. A program operated by the computing device 500 may be depicted in the display 506 and controlled by a sequence of instructions that are provided by the user through the keyboard 502 and/or through the touch pad 504. An internal battery (not shown) may be used to power the operations of the computing device 500.

The keyboard 502 includes an arrangement of keys 508 that can be individually selected when a user presses on a key with a sufficient force to cause the key 508 to be depressed towards a switch located underneath the keyboard 502. In response to selecting a key 508, a program may receive instructions on how to operate, such as a word processing program determining which types of words to process. A user may use the touch pad 504 to give different types of instructions to the programs operating on the computing device 500. For example, a cursor depicted in the display 506 may be controlled through the touch pad 504. A user may control the location of the cursor by sliding his or her hand along the surface of the touch pad 504. In some cases, the user may move the cursor to be located at or near an object in the computing device's display and give a command through the touch pad 504 to select that object. For example, the user may provide instructions to select the object by tapping the surface of the touch pad 504 one or more times.

The touch pad 504 may include a capacitance sensor disposed underneath a surface containing the keyboard 502. In some examples, the touch pad 504 is located in an area of the keyboard's surface where the user's palms may rest while typing. The capacitance sensor may include a printed circuit board that includes a first layer of electrodes oriented in a first direction and a second layer of electrodes oriented in a second direction that is transverse the first direction. These layers may be spaced apart and/or electrically isolated from each other so that the electrodes on the different layers do not electrically short to each other. Capacitance may be measured at the overlapping intersections between the electrodes on the different layers. However, as the user's finger or other electrically conductive objects approach the intersections, the capacitance may change. These capacitance changes and their associated locations may be quantified to determine where the user is touching or hovering his or her finger within the area of the touch pad 504. In some examples, the first set of electrodes and the second set of electrodes are equidistantly spaced with respect to each other. Thus, in these examples, the sensitivity of the touch pad 504 is the same in both directions. However, in other examples, the distance between the electrodes may be non-uniformly spaced to provide greater sensitivity for movements in certain directions.

In some cases, the display 506 is mechanically separate and movable with respect to the keyboard with a connection mechanism 510. In these examples, the display 506 and keyboard 502 may be connected and movable with respect to one another. The display 506 may be movable within a range of 0 degrees to 180 degrees with respect to the keyboard 502. In some examples, the display 506 may fold over onto the upper surface of the keyboard 502 when in a closed position, and the display 506 may be folded away from the keyboard 502 when the display 506 is in an operating position. In some examples, the display 506 may be orientable with respect to the keyboard 502 at an angle between 35 to 135 degrees when in use by the user. However, in these examples, the display 506 may be positionable at any angle desired by the user.

In some examples, the display 506 may be a non-touch sensitive display. However, in other examples at least a portion of the display 506 is touch sensitive. In these examples, the touch sensitive display may include a capacitance sensor that is located behind an outside surface of the display 506. As a user's finger or other electrically conductive object approaches the touch sensitive screen, the capacitance sensor may detect a change in capacitance as an input from the user.

While the example of FIG. 5 depicts an example of the computing device being a laptop, the capacitance sensor and touch surface may be incorporated into any appropriate device. A non-exhaustive list of devices includes, but is not limited to, a desktop, a display, a screen, a kiosk, a computing device, an electronic, tablet, another type of computing device, another type of device, or combinations thereof.

In the example of FIG. 5, the three-dimensional input device 512 is being held in the hand 514 of a user and is electrically connected to the computing device 500. The three-dimensional input device 512 has a cylindrical shape and the user can grasp the three-dimensional input device by circumscribing the perimeter of the three-dimensional input device with his or her hand. The three-dimensional input device 512 may be connected to the computing device through a Universal Serial Port connection, a wireless connection, a coaxial cable connection, a ribbon cable connection, another type of connection, or combinations thereof. The inputs given by the user through the three-dimensional input device 512 may be used to control programs and/or functions that are operating on the computing device 500. For example, the squeezing force applied by the user's hand 514 may be an input to the program operating on the computing device 500. In some examples, the program that uses inputs from the three-dimensional input device 512 may be a gaming program, a virtual reality program, an augmented reality program, a CAD program, a modeling programing, an engineering program, another type of program, or combinations thereof.

In the example of FIG. 5, the input device 512 is depicted as a hand held cylinder. However, the input device may take any appropriate shape, and/or be incorporated into any appropriate device. For example, the input device may be incorporated into a joystick, a mouse, a stylus, a ball, a half ball, a gaming controller, a touch surface, another type of input device, or combinations thereof.

Figure 6:
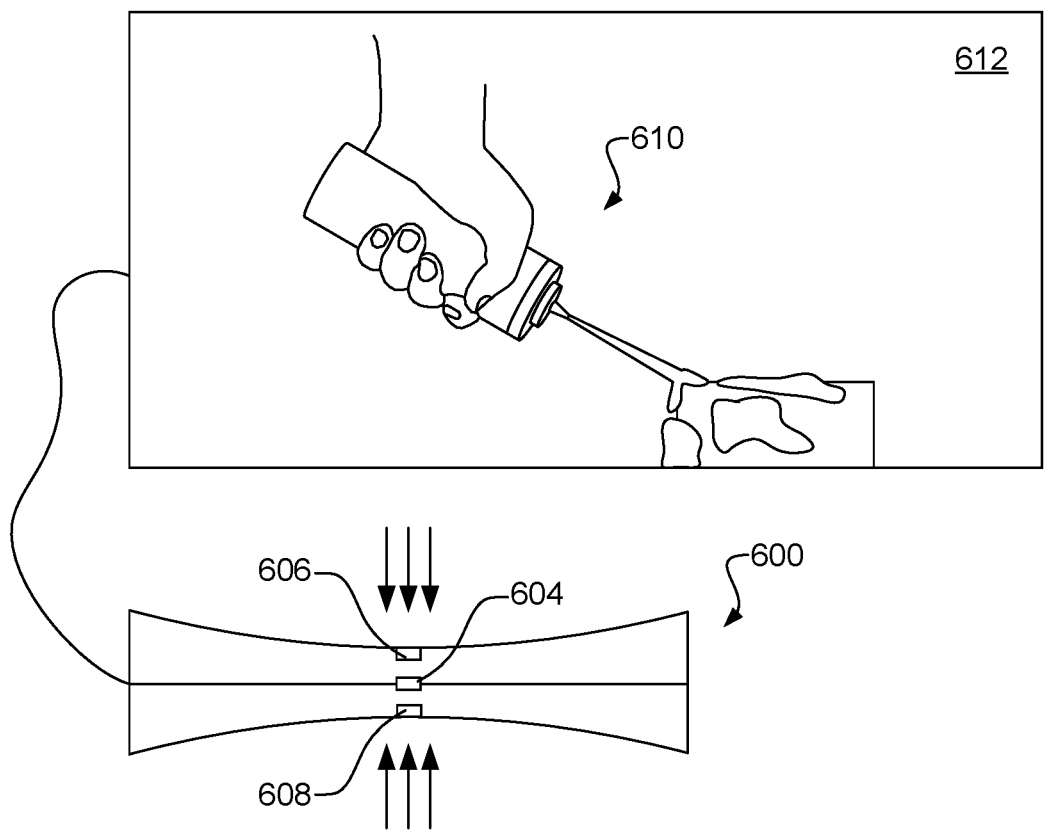
FIG. 6 depicts an example of a three-dimensional input device connected to a display where input from the three-dimensional input device is used to execute processes depicted in the display in accordance with the disclosure.

FIG. 6 depicts an example of the three-dimensional input device 600 being connected to a display 602. The display may depict images operated by a program being run on a computing device that is connected to the display. In some examples, such a program may be a gaming program, a virtual reality program, an augmented reality program, another type of program, or combinations thereof.

In this example, the three-dimensional input device 600 is depicted in a cross sectional view to illustrate an example of a central transmit electrode 604 and a first peripheral sense electrode 606 and a second peripheral sense electrode 608. As the three-dimensional input device 600 is being compressed so that a cross sectional width of the three-dimensional input device 600 shrinks, the first peripheral sense electrode 606 moves closer to the central transmit electrode 604. The program presenting the images on the display 602 may interpret that the first side of the three-dimensional input device has a force applied to it. Similarly, in this example, the second peripheral sense electrode 608 also moves closer to the central transmit electrode 604. The program presenting the images on the display 602 may interpret that the second side of the three-dimensional input device 600 also has a force applied to it. The program may interpret the movement of each of the peripheral sense electrodes 606, 608 independently and determine individual force measurements for the movement of each of the peripheral sense electrodes 606, 608. In other examples, the program may determine a single measurement for the force applied to the three-dimensional input device 600 based, at least in part, on the collective movement of the peripheral electrodes. In the depicted example, the program presenting the images on the display 602 may be a gaining program that involves squeezing a virtual tube 610. The program may use the forces applied to the three-dimensional input device 600 to determine a squeeze force to be used on the virtual tube 610 in the program's game.

In some cases with virtual or augmented reality programs, the input device may be a ball or other oblong shape that has sensors for the system to recognize the input device as a dedicated object that can take on details in the virtual or augmented environment. In this type of example, the user may pick up, squeeze, rotate, and/or touch the input device to provide an input into the system. In this manner, the system may receive inputs about the three-dimensional location of the input device, the pressure applied to the input device, the orientation of the input device, whether the input device is held or touched, another parameter about the input device, or combinations thereof. The touch sensors may transmit this data to the program's system as input data. Accordingly, a virtual shape, virtual location, virtual orientation, other virtual parameters, or combinations thereof may change based on the input data. A non-exhaustive list of virtual objects that the input device may be represented by in a virtual or augmented reality system include, but are not limited to, may include an orange, a piece of fruit, a baseball, an egg, a sock, an article of clothing, a hamburger, a piece of food, a tool, a weapon, a tool, a can of spray paint, an animal, a plant, another type of object, or combinations thereof. In some examples, when squeezed, the virtual object may pop, ooze, flatten, deform, roll, move, or otherwise act and/or give the user points.

While this example has been described with just two peripheral sense electrodes, any number of sense electrodes may be used. Further, while this example has been depicted with the three-dimensional input device having a cylindrical shape, the shape of the three-dimensional input device may be a generally sphere shaped device, a generally oblong shaped device, a generally rectangular shape, a generally triangular shape, a generally polygonal shape, another shape, or combinations thereof. Additionally, while this example depicts that the inputs from the three-dimensional user device are used to determine a virtual squeeze force, any appropriate program receiving inputs from the three-dimensional input device may use the inputs to determine any appropriate command and/or input. For example, the inputs from the three-dimensional input device may be used to, but are not limited to, determining a squeeze value, a compressive value, a tension value, a force value, a spinning value, a surface deflection value, a speed value, a shaking intensity value, a monetary value, a distance value, a dimensional value, squish value, thickness value, an orientation value, a rotational value, another type of value, or combinations thereof. In other examples or in additional to the examples presented above, the inputs from the three-dimensional input device may be used to, but are not limited to, executing a cutting command, a trigger command, a squeeze command, breaking command, running command, a movement command, a jumping command, a shooting command, a spinning command, a rotating command, a relaxing command, a freezing command, a measurement command, a grasping command, another type of command, or combinations thereof.

Figure 7:
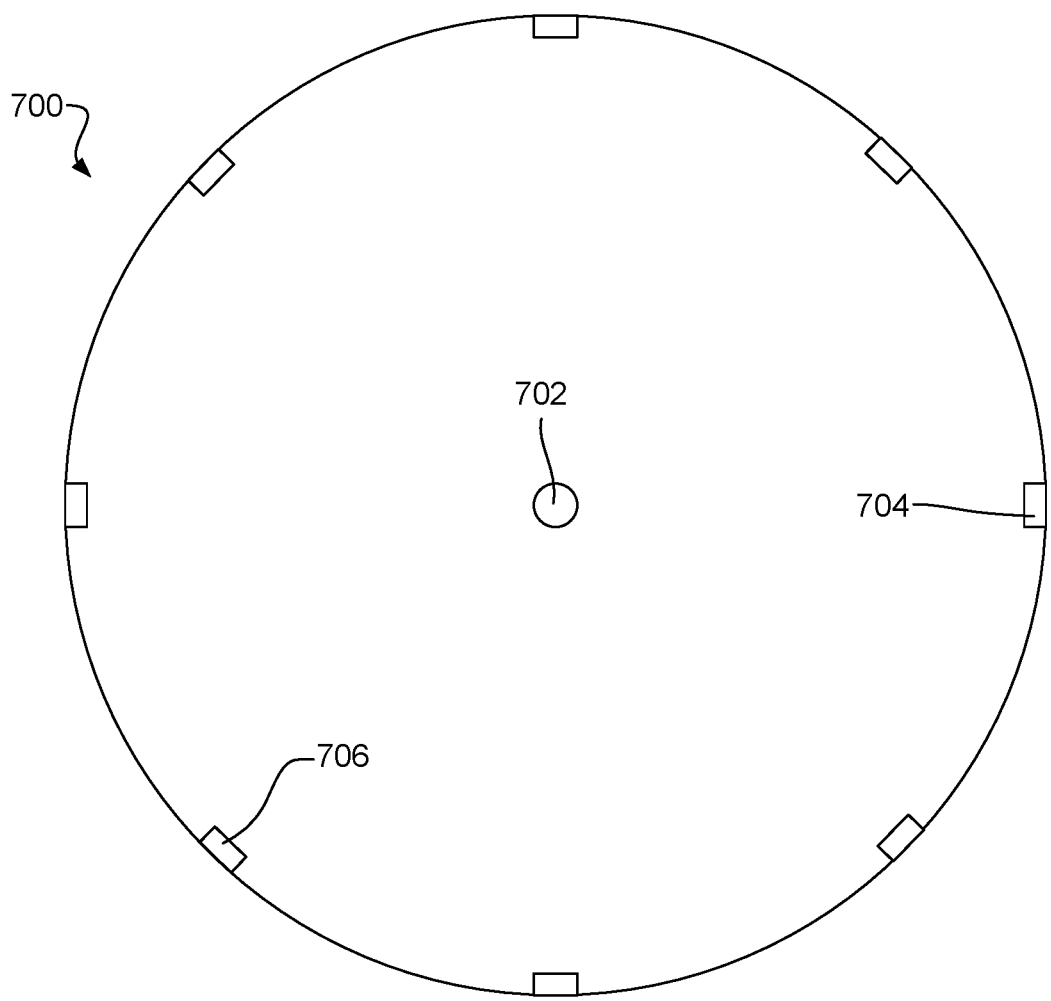
FIG. 7 depicts an example of a three-dimensional input device with proximity sensing in accordance with the disclosure.

FIG. 7 depicts another example of a three-dimensional input device 700. In this example, the three-dimensional input device 700 includes an interior electrode 702 and multiple peripheral electrodes. The interior electrode 702 may be a transmit electrode or a sense electrode or a combo electrode that measures self-capacitance and/or mutual capacitance. The peripheral electrodes include at least some peripheral transmit electrodes 704 and at least some peripheral sense electrodes 706 or they could be combo electrodes. The peripheral transmit electrodes 704 and the peripheral sense electrodes 706 or combo electrodes may be collectively used to detect proximity outside of the three-dimensional input device 700 while a portion of the peripheral electrodes may be used with the interior electrode 702 to detect the shape and/or force applied to the three-dimensional input device 700.

In situations where the interior electrode 702 functions as a transmit electrode, the peripheral sense electrodes 706 may measure the capacitance between the peripheral sense electrodes 706 and the interior electrode 702. Similarly, in situations where the interior electrode 702 functions as a sense electrode, the interior electrode 702 may measure the capacitance between the peripheral transmit electrodes 704 and the interior electrode 702.

The combination of the peripheral, sense electrodes 706 and the peripheral transmit electrodes 704 may be used to detect the presence of electrically conductive objects external to the three-dimensional input device 700. For example, the hand of a user may be detectable through the combination of the peripheral sense electrodes 706 and the peripheral transmit electrodes 704 even before the hand touches the three-dimensional input device 700.

In some examples, these peripheral sense electrodes 706 and the peripheral transmit electrodes 704 may use mutual capacitance to detect the presence of the user's hand or another electrically conductive object. The peripheral sense electrodes 706 and the peripheral transmit electrodes 704 may be arranged in rows and columns such that at least some of the peripheral sense electrodes 706 overlap with some of the peripheral transmit electrodes 704 at junctions. However, to prevent the peripheral sense electrodes 706 from shorting with the peripheral transmit electrodes 704, the peripheral sense electrodes 706 may be spaced apart from the peripheral transmit electrodes 704 and include an electrically isolating barrier at the junctions. The peripheral sense electrodes 706 may measure the capacitance at the junctions when a voltage is applied to the peripheral transmit electrodes 704. As a hand approaches the junction from outside of the three-dimensional input device 700, the capacitance at the junction changes. This change in capacitance may be used to determine the proximity of the hand.

In some cases, an electrode may be driven and sensed for self-capacitance measurements or mutual capacitance. In some case, self-capacitance measurements may be used for proximity sensing for maximum sensitivity.

In some embodiments, where the interior electrode 702 is a transmit electrode, the peripheral sense electrodes 706 may be used to both determine the distance between the peripheral sense electrodes 706 and the interior electrode 702 and also be used to determine proximity. In other examples, some of the peripheral sense electrodes 706 may be dedicated to detecting proximity, while other peripheral sense electrodes 706 are used to detect the distance between the peripheral electrodes and the interior electrode 702.

In some embodiments, where the interior electrode 702 is a sense electrode, the peripheral transmit electrodes 704 may be used to both determine the distance between the peripheral transmit electrodes 704 and the interior electrode 702 and also be used to determine proximity. In other examples, some of the peripheral transmit electrodes 704 may be dedicated to detecting proximity, while other peripheral transmit electrodes 704 are used to detect the distance between the peripheral electrodes and the interior electrode 702.

Proximity sensing and/or surface touch sensing may also be useful in programs that can run on computing devices. In some cases, the proximity sensing may also be useful in applications using virtual and/or augment reality. For example, input device may represent a virtual object that is a magic crystal that glows when a user's hand is near the input device. In this example, the virtual crystal ball may get brighter on the spots that are being touched. In another example, the virtual object may be a ketchup bottle, and the user needs to squeeze out ketchup on the burgers that the user is making in a vertical fast food restaurant. While specific examples of virtual objects and their functions have been presented in these examples, the principles in this disclosure may be applied to a wide variety of virtual objects and a wide variety of functions that the virtual objects are manipulated to perform. In some case, computations may be performed on the various measurements over the various electrodes to determine where fingers and/or palms are touching the device. Touch locations may be displayed on the display or in the virtual display showing the fingers in the correct location on the real device. The location sensing may be used to control or manipulate things in the virtual world such as buttons or switches that wouldn't be visible in the real world on the device.

Figure 8:
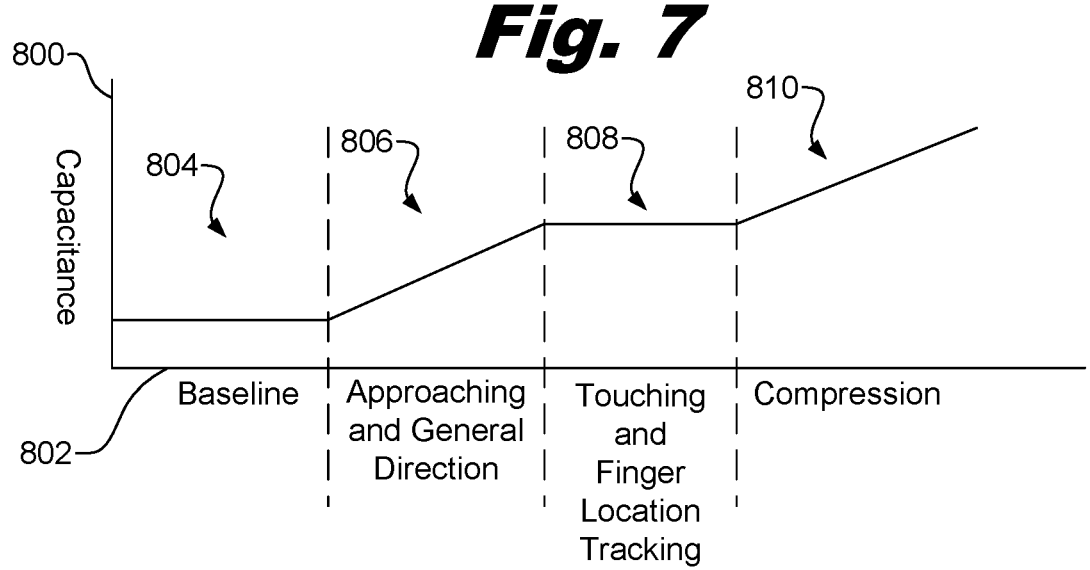
FIG. 8 depicts an example of a capacitance profile of a sense electrode incorporated into a three-dimensional input device with proximity in accordance with the disclosure.

FIG. 8 depicts an example of a capacitance measurement of a peripheral sense electrode. The x-axis 800 represents the capacitance measurement, and the y-axis 802 represents a progressively approaching object from outside the three-dimensional input device. In a first section 804, the object is far enough away from the three-dimensional input device such that the object does not influence the capacitance measured by the peripheral sense electrode. Under these conditions, the peripheral sense electrode may measure a baseline amount of capacitance. In a second section 806 of the y-axis 802, the object is approaching the three-dimensional input device. As the object gets closer, the object's electrical characteristics influence the electric field being measured by the peripheral sense electrode. Thus, in the second section 806, the capacitance is shown progressively increasing. A general direction of the approaching hand may be determined. In the third section 808 of the y-axis 802, the object has made contact with the outside of the three-dimensional input device, but is not exerting any pressure on the three-dimensional input device. Under these conditions, the capacitance measurement made by the peripheral sense electrode may remain constant since the distance between the object and the peripheral sense electrode is remaining constant. In some modes or regions of operation, precise locations of finger touches may be determined and tracked. In the fourth section 810, the object is exerting an inward force on the three-dimensional input device. Under these conditions, the distance between the object and the peripheral sense electrode remains the same, but the distance between the peripheral sense electrode and the interior transmit electrode decreases. Thus, the peripheral sense electrode is influenced by external changes from the object and the increasing proximity to the interior transmit electrode, both cause the capacitance measurement to increase.

While the example of FIG. 8 has been depicted to illustrate that the capacitance increases based on the proximity of the object and based on a progressively narrowing distance between the peripheral sense electrode and the interior electrode, in other examples where the circuitry is constructed in different patterns, the capacitance may go down, or may be affected in a different way. Further, in some examples, a peripheral sense electrode that is dedicated to sensing the distance to the interior electrode may be shielded from the influence of an outside object. Further, in other examples, a peripheral sense electrode that is dedicated to sensing the proximity of an outside object may be shielded from the influence of the interior electrode. In such examples, the controller may interpret changes in capacitance measurements from some peripheral sense electrodes for just changes in proximity while interpreting changes in other peripheral sense electrodes for just changes in the distance between the peripheral sense electrode and the interior electrode.

Figure 9:
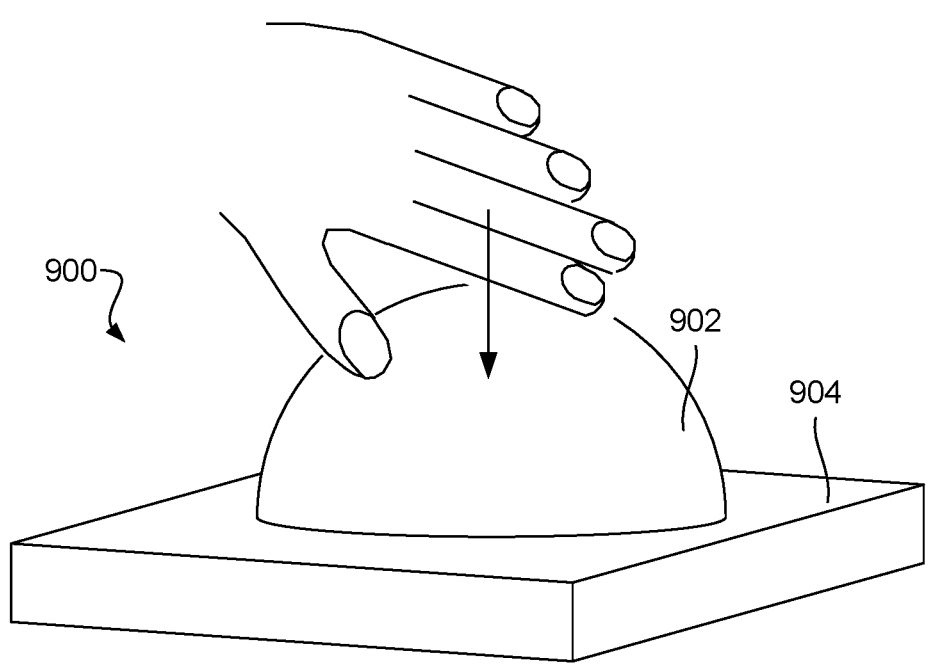
FIG. 9 depicts another example of a three-dimensional input device in accordance with the disclosure.

FIG. 9 depicts an example an input device 900. In this example, the exterior 902 of the input device 900 is formed by the flexible material. The flexible material forms a shape that is secured to a platform 904. The platform 904 may be secured to the exterior 902. In some cases, the flexible material defines the entire inner surface of the interior cavity of the input device 900. In other examples, the platform 904 may define a portion of the inner surface of the interior cavity.

The input device 900 depicted in FIG. 9 may be in communication with a computing device, and inputs to the input device 900 may be used to provide commands to programs operating on the computing device. In some examples, the inputs used to provide commands to the program may include, but are not limited to, proximity inputs, force inputs, shape inputs, capacitance inputs, distance inputs, expansion inputs, multiple inputs, another type of inputs, or combinations thereof.

Figure 10:
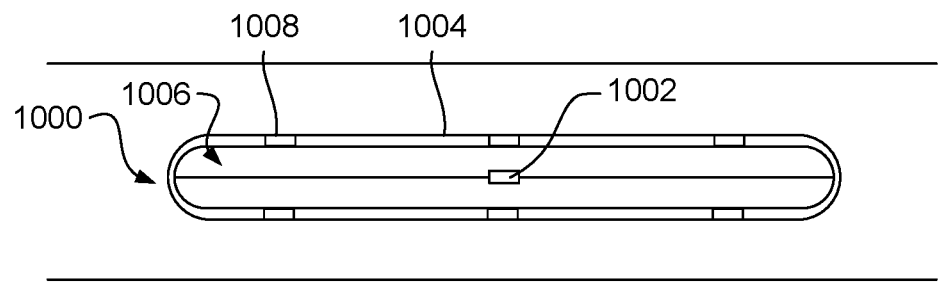
FIG. 10 depicts an example of an inflatable input device in accordance with the disclosure.

FIG. 10 depicts an example of an expandable input device 1000. In this example, an interior electrode 1002 may be positioned within a cavity 1006 defined by a flexible material 1004. Peripheral electrodes 1008 may be incorporated into or be attached to the flexible material.

Figure 11:
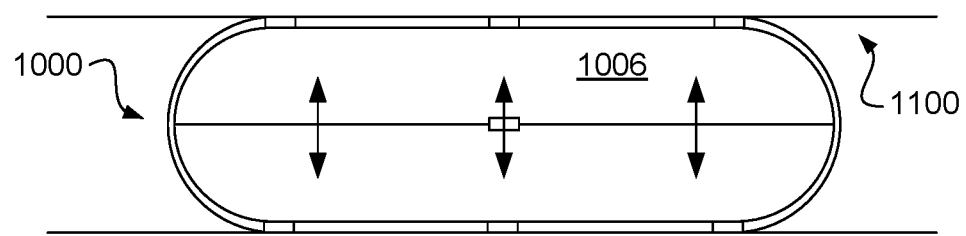
FIG. 11 depicts an example of an inflated input device in accordance with the disclosure.

FIG. 11 depicts an example where the input device 1000 is expanded. In this example, the internal pressure within the cavity 1006 may be increased to cause the input device 1000 to expand. In some examples, the internal pressure may be increased by increasing the amount of gas, liquid, or another type of material into the cavity. In the example of FIG. 11, the input device 1000 is inflated to the inside surface 1100 of a passage in which the input device 1000 is disposed. In such an example, an expandable input device, as depicted in FIG. 11, may be used to measure a parameter of the inside of the passage. For example, the expandable input device 1000 may be used to measure an inside diameter of the passage, a width of the passage, a length of the passage, an internal pressure of the passage, a strength of the inside surface of the passage, a shape of the passage, another characteristic of the passage, or combinations thereof.

Figure 12:
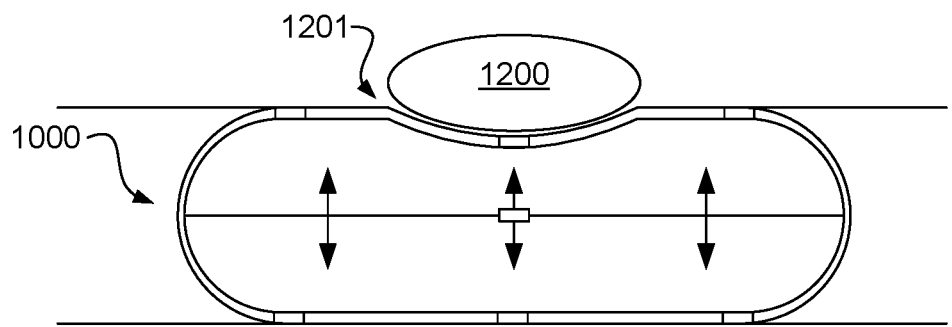
FIG. 12 depicts an example of an inflated input device deforming with its surrounding environment in accordance with the disclosure.

In the example of FIG. 12, the passage may include an obstruction or a non-uniform shape. The expansion of the input device 1000 may be used to measure the shape of the inside passage 1201, find the presence of an obstruction 1200, find a location of the obstruction 1200, determine another parameter of the inside passage, or combinations thereof.

In one example, the expandable input device 1000 may be used in an angioplasty procedure. For example, the input device 1000 may be inflated within a blood vessel to measure the size of buildup in a blood vessel. In some examples, the input device 1000 may be inflated to open the internal diameter of the blood vessel. The force from the expansion of the expandable input device may force the blood vessel open. To ensure that the blood vessel is opened enough, the infernal pressure of the input device 1000 may be increased to a predetermined pressure that should be sufficient to force the blood vessel open under normal circumstances. With the internal pressure at the predetermined level, the size of the internal passage may be measured. If the size of the expandable input device 1000 is large enough, it may be determined that the blood vessel's passage is opened far enough as well. If the input device's measurements indicate that the passage has not opened to the predetermined size under the predetermined internal pressure, the controller or the user of the input device may determine that an anomaly is present and initiate an appropriate investigation and remedy.

In some cases, the expandable input device is an angioplasty balloon. In some cases, the input device may be used to find a stent in the blood vessel. In yet other examples, the input device may be used to place a stent in the blood vessel. In some situations, the electrodes in the input device may be used to determine whether the stent has been released from the angioplasty balloon and/or has been placed in the desired location.

Figure 13:
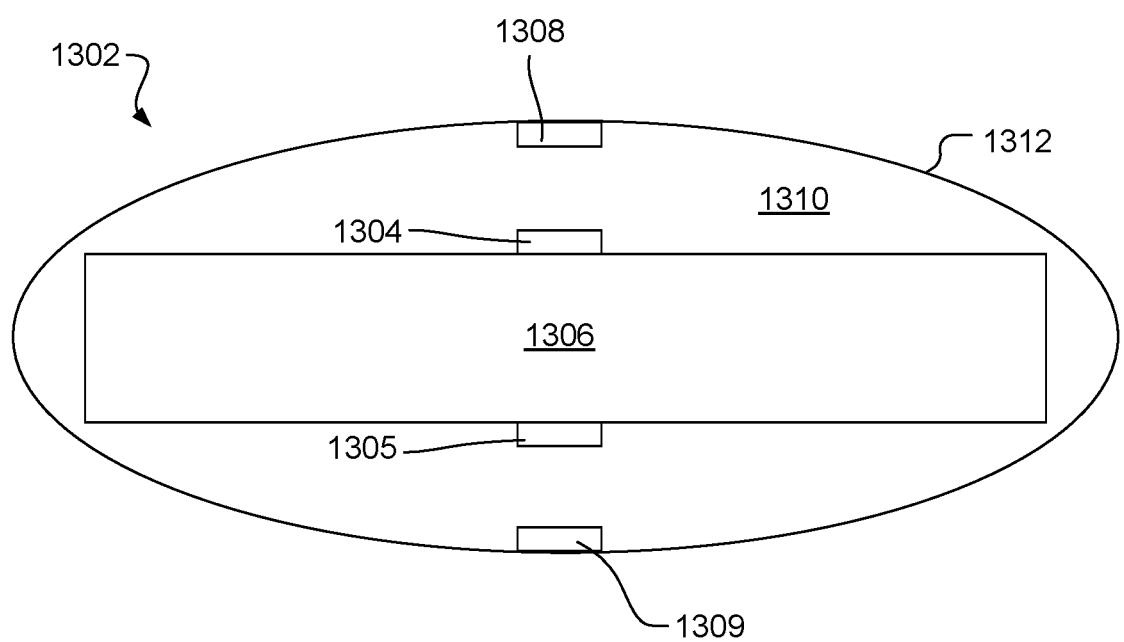
FIG. 13 depicts an example of an inflatable input device incorporated into a battery cell in accordance with the disclosure.

FIG. 13 depicts an example of an input device that is incorporated into a battery pack 1302. In some cases, the battery back is a soft lithium polymer battery pack. In the illustrated example, a first interior sense electrode 1304 and a second interior sense electrode 1305 may be located on an outer surface of the electrochemical structure 1306 of a battery pack 1302. In addition, a first transmit peripheral electrode 1308 and a second transmit peripheral electrode 1309 may be located on the inside of the cavity 1310 defined by a pouch 1312 of the battery pack 1302. While this examples depicts the interior electrodes 1304, 1305 as the sense electrode and the peripheral electrodes 1308, 1309 as the transmit electrodes, in alternative examples the role of the transmit and sensing electrodes may be reversed.

In some embodiments, a controller may be located on a printed circuit board, or the like, within the battery pouch 1312, or outside of the pouch 1312. In use, the controller interprets the capacitance measurements between the drive and sense electrodes when the electrodes are in close proximity providing a baseline capacitance measurement. In cases where the conditions of the battery deteriorate resulting in outgassing, gas may exit from the electrochemical structure 1306 into the cavity 1310 causing the pouch 1312 to fill with additional gas. The result of the increased gas in the cavity 1310 may result in the pouch 1312 expanding and causing the sense and transmit electrodes to move apart from each other.

In some cases, the controller may interpret an increased distance between the sense and the transmit electrodes to be a battery swelling condition. Commands may be sent to a computing device using the battery to deactivate. In other examples, the controller may send warnings or other types of instructions in response to determining that the battery is operating under a swelled condition. While this example has been used to describe the input device as a sensing device capable of determining a condition, other examples may be used to determine other types of conditions. For example, a non-exhaustive list of conditions that may detected by the input device may include, but is not limited to, includes determining an internal pressure, determining an expansion, determining a gas leak, determining a shrinkage, determining the existence of an external load, quantifying the amount of an external load, determining the existence of a bending condition, determining another condition, or combinations thereof.

In some cases, the peripheral electrodes 1308, 1309 associated with the pouch 1312 may be located on the outside of the pouch, may be located on the inside of the pouch, may be attached (directly or indirectly) to the inside surface of the pouch so that the electrode moves as the pouch moves, may be incorporated into the thickness of the pouch, or combinations thereof.

While the example of FIG. 13 depicts just two peripheral electrodes and just two interior electrodes, any appropriate number of peripheral electrodes and transmit electrodes may be used. In some cases, structures within the cavity, such as the electrochemical structure of a battery may shield the signal from a transmit electrode. In such conditions, additional transmit electrodes may be positioned within the cavity to obtain measurements in regions of the cavity that may have been otherwise blocked or shielded.

Figure 14:
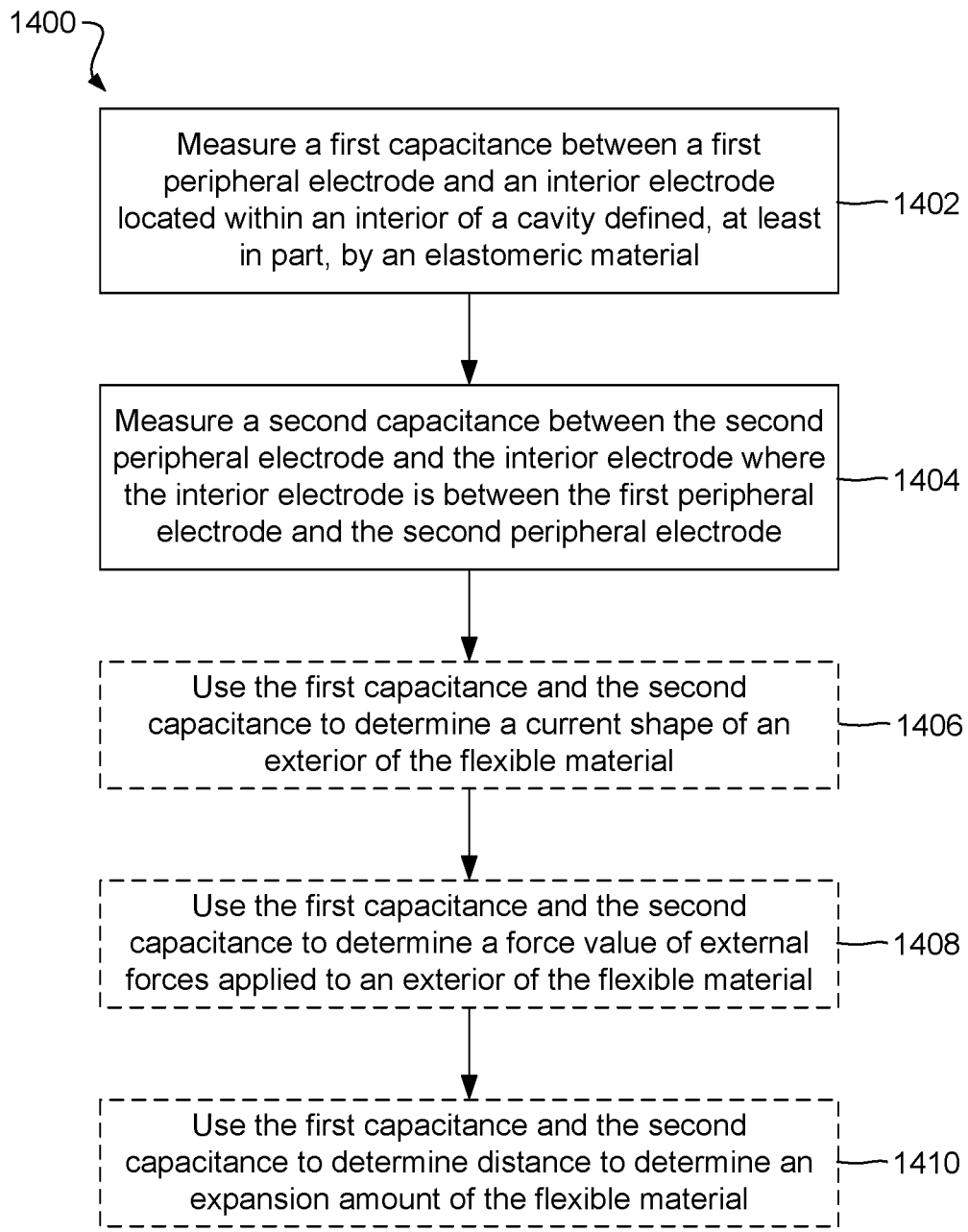
FIG. 14 depicts an example of a method of using an input device in accordance with the disclosure.

FIG. 14 depicts an example of a method 1400 of using an input device. This method 1400 may be performed based on the description of the devices, modules, and principles described in relation to FIGS. 1-13. In this example, the method 1400 includes measuring 1402 a first capacitance between a first peripheral electrode and an interior electrode located within an interior of a cavity defined, at least in part, by an elastomeric material and measuring 1404 a second capacitance between the second peripheral electrode and the interior electrode where the interior electrode is between the first peripheral electrode and the second peripheral electrode.

Optionally, the method 1400 may include using 1406 the first capacitance and the second capacitance to determine a current shape of an exterior of the flexible material. Also, the method 1400 may optionally include using 1408 the first capacitance and the second capacitance to determine a force value of external forces applied to an exterior of the flexible material. Further, another option is for the method 1400 to include using 1410 the first capacitance and the second capacitance to determine distance to determine an expansion amount of the flexible material.

Figure 15:
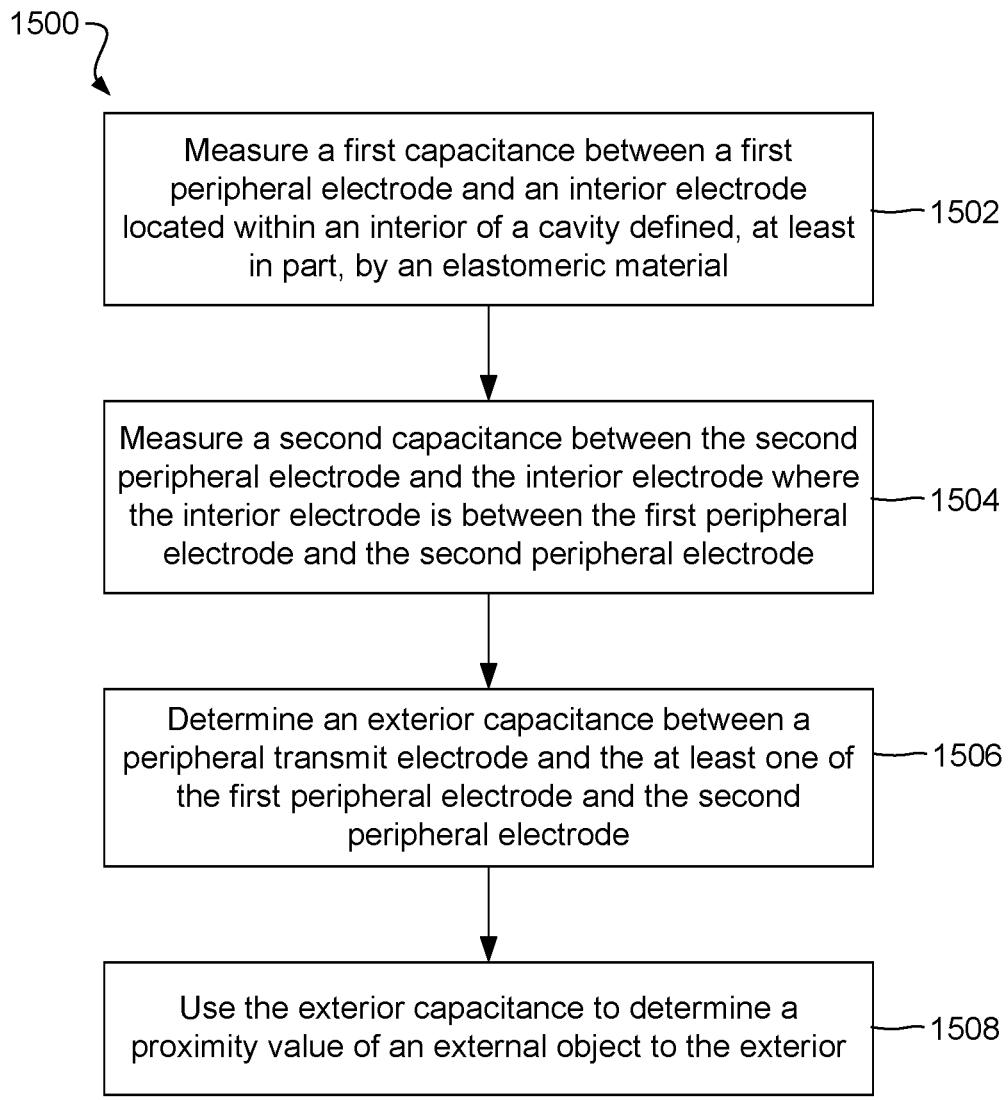
FIG. 15 depicts another example of a method of using an input device accordance with the disclosure.

FIG. 15 depicts an example of a method 1500 of using an input device. This method 1500 may be performed based on the description of the devices, modules, and principles described in relation to FIGS. 1-13. In this example, the method 1500 includes measuring 1502 a first capacitance between a first peripheral electrode and an interior electrode located within an interior of a cavity defined, at least in part, by an elastomeric material and measuring 1504 a second capacitance between the second peripheral electrode, the interior electrode where the interior electrode is between the first peripheral electrode and the second peripheral electrode, determining 1506 an exterior capacitance between a peripheral transmit electrode and at least one of the first peripheral electrode and the second peripheral electrode, and using 1508 the exterior capacitance to determine a proximity value of an external object to the exterior.

The computing device with the touch pad may be a laptop, a desk top, an external pad for providing input to a computing device or to the cloud computing device, a computing device, a networked device, an electronic tablet, a mobile device, a personal digital assistant, a control panel, a gaming device, a flat panel, a display, a television, another type of device, or combination thereof.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A device, comprising:
   a flexible material defining an exterior of a cavity;
   an interior electrode located within the cavity;
      a first peripheral electrode peripherally located with respect to the interior electrode on a first side of the interior electrode;
      a second peripheral electrode peripherally located with respect to the interior electrode on a second side of the interior electrode;
   wherein the interior electrode is between the first peripheral electrode and the second peripheral electrode;
   a controller electrically connected to the interior electrode, the first peripheral electrode, and the second peripheral electrode;
   programmed instructions written into memory of the controller, wherein the programmed instructions cause the controller, when executed to:
      measure a first capacitance between the first peripheral electrode and the interior electrode; and
      measure a second capacitance between the second peripheral electrode and the interior electrode.

2. The device of claim 1, wherein the interior electrode is located approximately in a central position of the cavity.

3. The device of claim 1, wherein the interior electrode is a transmit electrode, and the first peripheral electrode and the second peripheral electrode are sense electrodes.

4. The device of claim 1, where the flexible material is an elastomeric material.

5. The device of claim 1, wherein the flexible material defines an exterior of a ball when no external forces are applied to the exterior.

6. The device of claim 1, wherein the flexible material defines an exterior of a cylinder when no external forces are applied to the exterior.

7. The device of claim 1, wherein the programmed instructions further cause the controller, when executed, to:
   interpret the first capacitance to determine a first distance between the interior electrode and the first peripheral electrode;
   interpret the second capacitance to determine a second distance between the interior electrode and the second peripheral electrode;
   use the first distance and the second distance to determine a shape of the exterior when at least one external force is applied to the exterior.

8. The device of claim 1, wherein the programmed instructions further cause the controller, when executed, to:
   interpret the first capacitance to determine a first distance between the interior electrode and the first peripheral electrode;
   interpret the second capacitance to determine a second distance between the interior electrode and the second peripheral electrode;
   use the first distance and the second distance to determine a force value of external forces applied to the exterior.

9. The device of claim 1, wherein the programmed instructions further cause the controller, when executed, to:
   interpret the first capacitance to determine a first distance between the interior electrode and the first peripheral electrode;
   interpret the second capacitance to determine a second distance between the interior electrode and the second peripheral electrode;
   use the first distance and the second distance to determine an expansion amount of the exterior.

10. The device of claim 1, wherein the programmed instructions further cause the controller, when executed, to:
   subtract an influence on at least one of the first capacitance and the second capacitance, wherein the influence is generated by electrically conductive medium disposed within the cavity and connected to the interior electrode.

11. The device of claim 1, wherein measurement values of first capacitance and the second capacitance are used as inputs to control an aspect of a gaming application.

12. The device of claim 1, further comprising:
an electrically conductive medium connected to the interior electrode located within the cavity;
a shield covering the electrically conductive medium to prevent a voltage on the electrically conductive medium from affecting an electric field within the cavity.

13. The device of claim I, further comprising a peripheral transmit electrode;
wherein at least a portion of the peripheral transmit electrode is positioned adjacent to at least one of the first peripheral electrode and the second peripheral electrode;
wherein the programmed instructions cause the controller; when executed, to:
determine an exterior capacitance between the peripheral transmit electrode and the at least one of the first peripheral electrode and the second peripheral electrode; and
use the exterior capacitance to determine a proximity value of an external object to the exterior.

14. The device of claim 1, wherein at least one of the first peripheral electrode and the second peripheral electrode is attached to the flexible material.

15. The device of claim 1, wherein at least one of the first peripheral electrode and the second peripheral electrode is proximate to the flexible material.

16. A computer-program product for using a device, the computer-program product comprising a non-transitory computer-readable medium storing instructions executable by a processor to:
measure a first capacitance between a first peripheral electrode and an interior electrode located within an interior of a cavity defined, at least in part, by an elastomeric material; and
measure a second capacitance between the second peripheral electrode and the interior electrode;
wherein the interior electrode is between the first peripheral electrode and the second peripheral electrode.

17. The computer-program product of claim 16, wherein the instructions are executable by a processor to:
use the first capacitance and the second capacitance to determine a current shape of an exterior of the flexible material.

18. The computer-program product of claim 16, wherein the instructions are executable by a processor to:
use the first capacitance and the second capacitance to determine a force value of external forces applied to an exterior of the flexible material.

19. The computer-program product of claim 16, wherein the instructions are executable by a processor to:
use the first capacitance and the second capacitance to determine distance to determine an expansion amount of the flexible material.

20. The computer-program product of claim 16, wherein the instructions are executable by a processor to:
determine an exterior capacitance between a peripheral transmit electrode and the at least one of the first peripheral electrode and the second peripheral electrode; and
use the exterior capacitance to determine a proximity value of an external object to the exterior.

* * * * *